United States Patent
Mclennaghan et al.

(10) Patent No.: US 12,264,233 B2
(45) Date of Patent: Apr. 1, 2025

(54) COMPOSITIONS CONTAINING LOW MOLECULAR WEIGHT PROPYLENE-BASED POLYMERS AND AN OLEFIN MULTI-BLOCK COPOLYMER

(71) Applicant: Dow Global Technologies LLC, Midland, MI (US)

(72) Inventors: Allan Walter Mclennaghan, Lachen (CH); Yi Jin, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 938 days.

(21) Appl. No.: 17/047,575

(22) PCT Filed: Jun. 12, 2019

(86) PCT No.: PCT/US2019/036751
§ 371 (c)(1),
(2) Date: Oct. 14, 2020

(87) PCT Pub. No.: WO2019/241374
PCT Pub. Date: Dec. 19, 2019

(65) Prior Publication Data
US 2021/0115232 A1    Apr. 22, 2021

Related U.S. Application Data

(60) Provisional application No. 62/684,564, filed on Jun. 13, 2018.

(51) Int. Cl.
| | | |
|---|---|---|
| *C08L 23/08* | (2006.01) | |
| *C08F 210/16* | (2006.01) | |
| *C08L 23/0807* | (2025.01) | |

(52) U.S. Cl.
CPC ........ *C08L 23/0815* (2013.01); *C08F 210/16* (2013.01); *C08F 2500/02* (2013.01); *C08F 2500/03* (2013.01); *C08F 2500/07* (2013.01); *C08F 2500/12* (2013.01); *C08F 2500/17* (2013.01); *C08F 2500/22* (2013.01); *C08L 2207/06* (2013.01)

(58) Field of Classification Search
CPC .......... C08L 23/14; C08L 23/16; C08L 53/00; C08F 2500/03; C08F 2500/12; C08F 2500/17; C09J 123/16
See application file for complete search history.

(56) References Cited

U.S. PATENT DOCUMENTS

| | | | |
|---|---|---|---|
| 6,582,762 B2 | 6/2003 | Faissat et al. | |
| 6,582,829 B1 | 6/2003 | Quinn et al. | |
| 6,627,723 B2 | 9/2003 | Karandinos et al. | |
| 6,747,114 B2 | 6/2004 | Karandinos et al. | |
| 7,521,507 B2 | 4/2009 | Lewtas et al. | |
| 8,383,731 B2 | 2/2013 | Lewtas et al. | |
| 9,695,340 B2 | 7/2017 | Moriguchi et al. | |
| 2007/0026250 A1* | 2/2007 | Hofmeister | B32B 37/06 428/474.4 |
| 2011/0100438 A1* | 5/2011 | Gaston | C08L 23/12 136/252 |
| 2011/0306715 A1* | 12/2011 | Batra | C08L 91/00 524/505 |
| 2012/0165455 A1 | 6/2012 | Vitrano et al. | |
| 2013/0237655 A1 | 9/2013 | Chen et al. | |
| 2014/0147669 A1* | 5/2014 | Thatcher | C08J 5/125 524/81 |
| 2014/0256867 A1 | 9/2014 | Puerkner et al. | |
| 2017/0121478 A1* | 5/2017 | Han | C08J 7/043 |
| 2019/0276713 A1 | 9/2019 | Steib et al. | |

FOREIGN PATENT DOCUMENTS

| | | |
|---|---|---|
| EP | 2898035 | 7/2015 |
| WO | 2006102150 | 9/2006 |
| WO | 2009/029476 | 3/2009 |
| WO | 2011/011729 | 1/2011 |
| WO | 2012088384 A1 | 6/2012 |
| WO | 2012/129489 | 9/2012 |
| WO | 2014194087 | 12/2014 |
| WO | 2014205336 | 12/2014 |
| WO | 2016/028961 | 2/2016 |
| WO | 2016/029006 | 2/2016 |
| WO | 2016/029012 | 2/2016 |

OTHER PUBLICATIONS

PCT/US2019/036751, International Search Report and Written Opinion with a mailing date of Sep. 25, 2019.
PCT/US2019/036751, International Preliminary Report on Patentability with a mailing date of Dec. 15, 2020.

* cited by examiner

*Primary Examiner* — Michael M Dollinger
(74) *Attorney, Agent, or Firm* — Karen L. Beckman

(57) ABSTRACT

A composition comprising the following components: A) propylene/ethylene copolymer that has a density ≤0.880 g/cc, and a MWD(conv) from 2.00 to 3.00 and a melt viscosity (177 C)≤80,000 mPa*s; B) olefin multi-block copolymer that has a density ≤0.890 g/cc and a melt index (I2)≥0.5 g/10 min.

14 Claims, No Drawings

COMPOSITIONS CONTAINING LOW MOLECULAR WEIGHT PROPYLENE-BASED POLYMERS AND AN OLEFIN MULTI-BLOCK COPOLYMER

CROSS-REFERENCE TO RELATED APPLICATIONS

The present application claims the benefit of priority to U.S. Provisional Patent Application No. 62/684,564, filed on Jun. 13, 2018, which is incorporated herein in its entirety.

BACKGROUND

Formulated polymer compositions are used for adhesives. Typically for an adhesive, there is a need to balance two opposing requirements: the need for an adhesive with high cohesion (for example, as determined by Peel Force), and the need for low adhesive viscosity, to provide improved application of the adhesive, and to reduce strike through of the adhesive during the preparation of a laminate.

Polymer compositions for use in adhesives and other compositions are disclosed in the following references: U.S. Pat. Nos. 9,695,340 6,627,723, 6,747,114, 7,521,507, 6,582, 762, 8,383,731; U.S. 2014/0256867, U.S. 2012/0165455, WO 2016/029006, WO 2016/029012, WO 2016/028961, WO2012/129489, WO2011/011729, WO2009/029476, and EP2898035A1. However, there remains a need for improved adhesive compositions as discussed above. This need has been met by the following invention.

SUMMARY OF INVENTION

A composition comprising the following components:
A) a propylene/ethylene copolymer that has a density ≤0.880 g/cc, and a MWD(conv) from 2.00 to 3.00, and a melt viscosity (177° C.)≤80,000 mPa·s;
B) olefin multi-block copolymer that has a density ≤0.890 g/cc, and a melt index (I2)≥0.5 g/10 min.

DETAILED DESCRIPTION

Adhesive compositions have been discovered with good adhesion and improved processing characteristics, which include eliminating the occurrence of strike-through that can occur during the preparation of a non-woven/backsheet laminate.

As discussed above, a composition is provided comprising the following components:
A) a propylene/ethylene copolymer (random) that has a density ≤0.880 g/cc, and a MWD(conv) from 2.00 to 3.00 and a melt viscosity (177° C.)≤80,000 mPa·s;
B) olefin multi-block copolymer, and further an olefin multi-block copolymer that has a density ≤0.890 g/cc and a melt index (I2)≥0.5 g/10 min.

The composition may comprise a combination of two or more embodiments described herein.

The propylene/ethylene copolymer may comprise a combination of two or more embodiments as described herein.

The olefin multi-block copolymer may comprise a combination of two or more embodiments as described herein.

In one embodiment, or a combination of embodiments described herein, the propylene/ethylene copolymer has a density ≥0.855 g/cc, or ≥0.858 g/cc, or ≥0.860 g/cc, or ≥0.862 g/cc, or ≥0.865 g/cc (1 cc=1 cm$^3$).

In one embodiment, or a combination of embodiments described herein, the propylene/ethylene copolymer has a density ≤0.885 g/cc, or ≤0.880 g/cc, or ≤0.878 g/cc, or ≤0.875 g/cc, or ≤0.870 g/cc.

In one embodiment, or a combination of embodiments described herein, the propylene/ethylene copolymer has a density from 0.860 to 0.875 g/cc, or from 0.860 to 0.870 g/cc, or from 0.860 to 0.868 g/cc.

In one embodiment, or a combination of embodiments described herein, the propylene/ethylene copolymer has a melt viscosity (177° C.)≥400 mPa·s, or ≥500 mPa·s, or ≥600 mPa·s, or ≥700 mPa·s.

In one embodiment, or a combination of embodiments described herein, the propylene/ethylene copolymer has a melt viscosity (177° C.)≥800 mPa·s, or ≥1000 mPa·s, or 1200 mPa·s, or ≥1400 mPa·s.

In one embodiment, or a combination of embodiments described herein, the propylene/ethylene copolymer has a melt viscosity (177° C.)≤50,000 mPa·s, or ≤40,000 mPa·s, or ≤30,000 mPa·s, or ≤25,000 mPa·s≤20,000 mPa·s, or ≤15,000 mPa·s, or ≤12,000 mPa·s, or ≤10,000 mPa·s, or ≤8,000 mPa·s.

In one embodiment, or a combination of embodiments described herein, the propylene/ethylene copolymer has a melt viscosity (177° C.)≤16,000 mPa·s, or ≤14,000 mPa·s, or ≤12,000 mPa·s, or ≤10,000 mPa·s, or ≤9,000 mPa·s, or ≤8,000 mPa·s.

In one embodiment, or a combination of embodiments described herein, to the propylene/ethylene copolymer has a melt viscosity (177° C.) from 2,000 mPa·s to 12,000 mPa·s, or from 4,000 mPa·s to 10,000 mPa·s, or from 5,000 mPa·s to 9,000 mPa·s, or from 6,000 mPa·s to 9,000 mPa·s.

In one embodiment, or a combination of embodiments described herein, the propylene/ethylene copolymer has a melt flow rate MFR from 500 to 3000 g/10 min, or from 600 to 2500 g/10 min, or from 700 to 2000 g/10 min, or from 800 to 1500 g/10 min, or from 900 to 1200 g/10 min.

In one embodiment, or a combination of embodiments described herein, the propylene/ethylene copolymer has a weight average molecular weight (Mw) from 30,000 to 70,000 g/mole, or from 35,000 to 60,000 g/mole, or from 40,000 to 50,000 g/mole.

In one embodiment, or a combination of embodiments described herein, the propylene/ethylene copolymer has a number average molecular weight (Mn) from 10,000 to 30,000 g/mole, or from 12,000 to 25,000 g/mole, or from 16,000 to 22,000 g/mole.

In one embodiment, or a combination of embodiments described herein, the propylene/ethylene copolymer has a Mw/Mn from 2.00 to 4.00, or from 2.00 to 3.50, or from 2.00 to 3.00, or from 2.00 to 2.50, or from 2.10 to 2.45, or from 2.20 to 2.40.

In one embodiment, or a combination of embodiments described herein, the propylene/ethylene copolymer has a melting temperature (Tm) from 55° C. to 95° C., or from 60° C. to 90° C., or from 65° C. to 85° C., or from 70° C. to 80° C.

In one embodiment, or a combination of embodiments described herein, the propylene/ethylene copolymer has a percent crystallinity from 2.0% to 28%, or from 4.0% to 26%, or from 6.0% to 24%, or from 8.0% to 22%, or from 10% to 20%.

In one embodiment, or a combination of embodiments described herein, the propylene/ethylene copolymer has a crystallization temperature (Tc) from −15° C. to −2° C., or from −13° C. to −4° C., or from −11° C. to −6° C.

In one embodiment, or a combination of embodiments described herein, the propylene/ethylene copolymer is present in the composition in an amount from 5.0 wt %, or 10 wt %, or 15 wt %, to 25 wt %, or 30 wt %, or 35 wt %, or 40 wt %, or 45 wt %, based on weight of the composition.

The propylene/ethylene copolymer may comprise two or more embodiments disclosed herein.

In one embodiment, or a combination of embodiments described herein, the olefin multi-block copolymer is an ethylene multi-block copolymer, and further an ethylene/alpha-olefin multi-block copolymer. The α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene and 1-octene, and more preferably 1-octene.

In one embodiment, or a combination of embodiments described herein, the olefin multi-block copolymer has a density ≥0.855 g/cc, or ≥0.858 g/cc, or ≥0.860 g/cc, or ≥0.862 g/cc, or ≥0.865 g/cc (1 cc=1 cm$^3$). In a further embodiment, the olefin multi-block copolymer is an ethylene multi-block copolymer, and further an ethylene/alpha-olefin multi-block copolymer. Suitable α-olefins are discussed above.

In one embodiment, or a combination of embodiments described herein, the olefin multi-block copolymer has a density ≤0.885 g/cc, or ≤0.880 g/cc, or ≤0.878 g/cc, or ≤0.875 g/cc, or ≤0.870 g/cc. In a further embodiment, the olefin multi-block copolymer is an ethylene multi-block copolymer, and further an ethylene/alpha-olefin multi-block copolymer. Suitable α-olefins are discussed above.

In one embodiment, or a combination of embodiments described herein, the olefin multi-block copolymer has a melt index I2≥1.0 g/10 min, or ≥2.0 g/10 min, or ≥4.0 g/10 min, or ≥6.0 g/10 min, or ≥8.0 g/10 min, or ≥10 g/10 min. In a further embodiment, the olefin multi-block copolymer is an ethylene multi-block copolymer, and further an ethylene/alpha-olefin multi-block copolymer. Suitable α-olefins are discussed above.

In one embodiment, or a combination of embodiments described herein, the olefin multi-block copolymer has a melt index I2≤50 g/10 min, or ≤45 g/10 min, or ≤40 g/10 min, or ≤35 g/10 min, or ≤30 g/10 min or ≤25 g/10 min, or ≤20 g/10 min. In a further embodiment, the olefin multi-block copolymer is an ethylene multi-block copolymer, and further an ethylene/alpha-olefin multi-block copolymer. Suitable α-olefins are discussed above.

In one embodiment, or a combination of embodiments described herein, the olefin multi-block copolymer has a melt index I2 from 5.0 to 30 g/10 min, or from 8.0 to 25 g/10 min, or from 10 to 20 g/10 min, or from 12 to 18 g/10 min, or from 14 to 16 g/10 min. In a further embodiment, the olefin multi-block copolymer is an ethylene multi-block copolymer, and further an ethylene/alpha-olefin multi-block copolymer. Suitable α-olefins are discussed above.

In one embodiment, or a combination of embodiments described herein, the olefin multi-block copolymer is present in the composition in an amount from 2.0 wt %, or 4.0 wt %, or 6.0 wt %, to 12 wt %, or 14 wt %, or 16 wt %, or 18 wt %, or 20 wt %, based on weight of the composition. In a further embodiment, the olefin multi-block copolymer is an ethylene multi-block copolymer, and further an ethylene/alpha-olefin multi-block copolymer. Suitable α-olefins are discussed above.

In one embodiment, or a combination of embodiments described herein, the weight ratio of component A to component B from 1.2 to 5.0, or from 1.4 to 4.5, or from 1.6 to 4.0, or from 1.7 to 3.5, or from 1.8 to 3.0.

In one embodiment, or a combination of embodiments described herein, the composition further comprises the following: at least one tackifier; optionally, at least one oil; and optionally at least one wax.

In one embodiment, or a combination of embodiments described herein, the composition further comprises the following: at least one tackifier, at least one oil, and optionally at least one wax.

In one embodiment, or a combination of embodiments described herein, the composition comprises a tackifier. In a further embodiment, the tackifier is a hydrogenated tackifier.

In one embodiment, or a combination of embodiments described herein, the composition further comprises the following: at least one tackifier and at least one oil. In a further embodiment, the tackifier is a hydrogenated tackifier.

In one embodiment, or a combination of embodiments described herein, the composition comprises from 45 wt % to 75 wt %, or from 45 wt % to 75 wt %, or from 50 wt % to 70 wt %, or from 55 wt % to 65 wt % tackifier, based on the weight of the composition. In a further embodiment, the tackifier is a hydrogenated tackifier.

In one embodiment, or a combination of embodiments described herein, the composition comprises from 1.0 wt % to 20 wt %, or from 2.0 wt % to 18 wt %, or from 4.0 wt % to 16 wt %, or from 6.0 wt % to 14 wt %, or from 8.0 wt % to 12 wt % oil, based on the weight of the composition.

In one embodiment, or a combination of embodiments described herein, the composition has a melt viscosity, at 150° C., from 500 mPa·s to 20,000 mPa·s, or from 1,000 mPa·s to 15,000 mPa·s, or from 3,000 mPa·s to 10,000 mPa·s, or from 2,000 mPa·s to 8,000 mPa·s, or from 2,500 mPa·s to 6,000 mPa·s, or from 2,500 mPa·s to 5,000 mPa·s.

In one embodiment, or a combination of embodiments described herein, the composition has a melt viscosity, at 150° C., from 500 mPa·s to 8,000 mPa·s, or from 1000 mPa·s to 7,000 mPa·s, or from 2,000 mPa·s to 6,000 mPa·s, or from 2,500 mPa·s to 5,000 mPa·s.

In one embodiment, or a combination of embodiments described herein, the composition has a peel strength (N/25 mm)≥0.7, or ≥0.8, or ≥0.9, or ≥1.0. In a further embodiment, the composition shows no roll sticking, as described herein.

In one embodiment, or a combination of embodiments described herein, the composition has a peel strength (N/25 mm) from 0.7 to 3.5, or from 0.8 to 3.2, or from 0.9 to 3.0, or from 1.0 to 3.0, or from 1.2 to 3.0, or from 1.4 to 3.0. In a further embodiment, the composition shows no roll sticking, as described herein.

In one embodiment, or a combination of embodiments described herein, the composition comprises from 5.0 to 30 wt %, or from 10 to 25 wt % of the propylene/ethylene copolymer; from 40 to 70 wt %, from 50 to 65 wt % of a tackifier, and from 5.0 to 15 wt %, or from 7.0 to 12 wt % of an oil; each wt % based on the weight of the composition.

In one embodiment, or a combination of embodiments described herein, the composition further comprises one or more additives selected from antioxidants (for example, IRGANOX 1010, IRGANOX 1076, and/or IRGAFOS 168), fillers and/or colorants.

In one embodiment, or a combination of embodiments described herein, the composition further comprises from 0.10 to 1.00 wt %, or from 0.20 to 0.80 wt %, or from 0.50 to 0.60 wt % of one or more antioxidants (for example, IRGANOX 1010, IRGANOX 1076, and/or IRGAFOS 168); based on the weight of the composition.

In one embodiment, or a combination of embodiments describe herein, the composition comprises ≤0.10 wt %, or ≤0.05 wt %, or ≤0.01 wt % of EVA, based on the weight of the composition. In a further embodiment, the composition does not comprise EVA.

In one embodiment, or a combination of embodiments describe herein, the composition comprises ≤0.10 wt %, or ≤0.05 wt %, or ≤0.01 wt % of an ethylene-based polymer, based on the weight of the composition, not including the copolymer of component B. In a further embodiment, the composition does not comprise such an ethylene-based polymer.

In one embodiment, or a combination of embodiments describe herein, the composition comprises ≤0.10 wt %, or ≤0.05 wt %, or ≤0.01 wt % of an ethylene/alpha-olefin random copolymer, based on the weight of the composition. In a further embodiment, the composition does not comprise an ethylene/alpha-olefin random copolymer.

In one embodiment, or a combination of embodiments describe herein, the composition comprises ≤0.10 wt %, or ≤0.05 wt %, or ≤0.01 wt % of an ethylene/alpha-olefin terpolymer (for example, an ethylene/propylene/C4-C20 alpha-olefin terpolymer), based on the weight of the composition. In a further embodiment, the composition does not comprise an ethylene/alpha-olefin terpolymer.

In one embodiment, or a combination of embodiments describe herein, the composition comprises ≤0.10 wt %, or ≤0.05 wt %, or ≤0.01 wt % of an ethylene/alpha-olefin/diene terpolymer (for example, an EPDM), based on the weight of the composition. In a further embodiment, the composition does not comprise an ethylene/alpha-olefin/diene terpolymer.

In one embodiment, or a combination of embodiments describe herein, the composition comprises ≤0.10 wt %, or ≤0.05 wt %, or ≤0.01 wt % of a polyethylene homopolymer (for example, a HDPE or a LDPE), based on the weight of the composition. In a further embodiment, the composition does not comprise a polyethylene homopolymer.

In one embodiment, or a combination of embodiments describe herein, the composition comprises ≤0.10 wt %, or ≤0.05 wt %, or ≤0.01 wt % of a polymer containing, in polymerized form, styrene, based on the weight of the composition. In a further embodiment, the composition does not comprise a polymer containing, in polymerized form, styrene.

In one embodiment, or a combination of embodiments describe herein, the composition comprises ≤0.10 wt %, or ≤0.05 wt %, or ≤0.01 wt % of a fluoro-containing polymer, based on the weight of the composition. In a further embodiment, the composition does not comprise a fluoro-containing polymer.

In one embodiment, or a combination of embodiments describe herein, the composition comprises ≤0.10 wt %, or ≤0.05 wt %, or ≤0.01 wt % of a polyurethane, based on the weight of the composition. In a further embodiment, the composition does not comprise a polyurethane.

In one embodiment, or a combination of embodiments describe herein, the composition comprises ≤0.10 wt %, or ≤0.05 wt %, or ≤0.01 wt % of an atactic propylene-based polymer, based on the weight of the composition. In a further embodiment, the composition does not comprise an atactic propylene-based polymer.

In one embodiment, or a combination of embodiments describe herein, the composition comprises ≤0.10 wt %, or ≤0.05 wt %, or ≤0.01 wt % of a polypropylene homopolymer, based on the weight of the composition. In a further embodiment, the composition does not comprise a polypropylene homopolymer.

In one embodiment, or a combination of embodiments describe herein, the composition comprises ≤0.10 wt %, or ≤0.05 wt %, or ≤0.01 wt % of a filler, based on the weight of the composition. In a further embodiment, the composition does not comprise a filler (for example, carbon black or silica).

The invention also provides an article comprising at least one component formed from the composition of one or more embodiments described herein. Nonlimiting examples of suitable articles include articles including a nonwoven fabric adhered to an olefin-based polymer backsheet, such as diapers and feminine hygiene products.

In one embodiment, or a combination of embodiments described herein, the article is a building material, a coated fabric, a medical device, a hygiene article, a toy or sporting good, a footwear component, a floor tile, a carpet, or an automotive part.

In one embodiment, or a combination of embodiments described herein, the article is an laminate, a multi-layered film, a book, a sealant, a molded good, a piece of furniture, a roofing tile, a molding or trim, a window, a door, a luggage or a leather good.

In one embodiment, or a combination of embodiments described herein, the article further comprises a substrate. In a further embodiment, the substrate is a non-woven fabric. As used herein a "non-woven fabric" is an assembly of monocomponent and/or bicomponent fibers (for example, core/sheath, islands in the sea, side-by side, segmented pie etc.) held together in a random web, such as by mechanical interlocking, or by fusing at least a portion of the fibers. The following descriptions provide nonlimiting procedures for producing nonwoven fabric. Fibers produced by melt spinning processes that include staple fiber spinning (including short spinning, long spinning), Spunbond, melt blown, or multiple combinations thereof, can be formed into a web, which is thereafter formed into a nonwoven fabric using binding technologies, such as carded thermal bonding, wetlaid, airlaid, air through bonding, calendar thermal bonding, hydro entanglement, needle punching, adhesive bonding or any combinations thereof.

In one embodiment, or a combination of embodiments described herein, the composition forms a seal between the at least one surface of a substrate and at least one surface of another substrate.

In one embodiment, or a combination of embodiments described herein, each substrate is a component of a hygiene article.

In one embodiment, or a combination of embodiments described herein, at least one substrate is wood.

In one embodiment, or a combination of embodiments described herein, at least one substrate is selected from paper, cardboard, fabric or plastic or metal.

An inventive composition may comprise two or more embodiments disclosed herein.

An inventive article may comprise a combination of two or more embodiments disclosed herein.

Olefin Multi-Block Copolymer

In one embodiment, the olefin multi-block copolymer is an ethylene/α-olefin multi-block copolymer, which comprises 50 wt % or a majority amount of polymerized ethylene, based on the weight of the polymer.

The term "olefin block copolymer" or "OBC" means an ethylene/α-olefin multi-block copolymer and includes ethylene and one or more, and preferably one, copolymerizable α-olefin comonomer in polymerized form, characterized by multiple blocks or segments of two or more, and preferably two, polymerized monomer units differing in chemical or physical properties. When referring to amounts of "ethylene" or "comonomer" in the copolymer, it is understood that this means polymerized units thereof. In some embodiments, the multi-block copolymer can be represented by the following formula:

(AB)$_n$, where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB.

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having three or more carbon atoms. In some embodiments, the olefin block copolymer may comprise 50 mol % to 90 mol % ethylene, preferably 60 mol % to 85 mol %, more preferably 65 mol % to 80 mol %. For many ethylene/octene block copolymers, the preferred composition comprises an ethylene content greater than 80 mole percent of the whole polymer and an octene content of from 10 to 15, preferably from 15 to 20 mole percent of the whole polymer.

The olefin block copolymer includes various amounts of "hard" and "soft" segments. "Hard" segments are blocks of polymerized units in which ethylene is present in an amount greater than 95 weight percent, or greater than 98 weight percent based on the weight of the polymer, up to 100 weight percent. In other words, the comonomer content (content of monomers other than ethylene) in the hard segments is less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an OBC from 1 weight percent to 99 weight percent of the total weight of the OBC, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the OBC. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-polymers," filed on Mar. 15, 2006, in the name of Colin L. P. Shan, Lonnie Hazlitt, et al. and assigned to Dow Global Technologies Inc., the disclosure of which is incorporated by reference herein in its entirety. In particular, hard and soft segment weight percentages and comonomer content may be determined as described in Column 57 to Column 63 of U.S. Pat. No. 7,608,668.

The olefin block copolymer is a polymer comprising two or more chemically distinct regions or segments (referred to as "blocks") preferably joined in a linear manner, that is, a polymer comprising chemically differentiated units, which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present OBC is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

In an embodiment, the OBC is produced in a continuous process, and possesses a polydispersity index, PDI (or MWD), from 1.7 to 3.5, or from 1.8 to 3, or from 1.8 to 2.5, or from 1.8 to 2.2. When produced in a batch or semi-batch process, the OBC possesses PDI from 1.0 to 3.5, or from 1.3 to 3.0, or from 1.4 to 2.5, or from 1.4 to 2.0.

In addition, the olefin block copolymer possesses a PDI fitting a Schultz-Flory distribution rather than a Poisson distribution. The present OBC has both a polydisperse block distribution, as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present olefin block copolymer possesses a most probable distribution of block lengths. In an embodiment, the olefin block copolymer is defined as having:

(A) Mw/Mn from 1.7 to 3.5, at least one melting point, Tm, in degrees Celsius, and a density, d, in grams/cubic centimeter, where in the numerical values of Tm and d correspond to the relationship:

$$Tm \geq -2002.9 + 4538.5(d) - 2422.2(d)^2, \text{ and/or}$$

(B) Mw/Mn from 1.7 to 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T \geq -0.1299 \Delta H + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re \geq 1481 - 1629(d); \text{ and/or}$$

(D) has a molecular fraction which elutes between 40° C. and 130° C. when fractionated using TREF, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.; and/or, (E) has a storage modulus at 25° C., G'(25° C.), and a storage modulus at 100° C., G'(100° C.), wherein the ratio of G'(25° C.) to G'(100° C.) is in the range of 1:1 to 9:1.

The olefin block copolymer may also have:

(F) a molecular fraction which elutes between 40° C. and 130° C. when fractionated using TREF, characterized in that the fraction has a block index of at least 0.5 and up to 1 and a molecular weight distribution, Mw/Mn, greater than 1.3; and/or (G) average block index greater than zero and up to 1.0 and a molecular weight distribution, Mw/Mn greater than 1.3. It is understood that the olefin block copolymer may have one, some, all, or any combination of properties (A)-(G). Block Index can be determined as described in detail in U.S. Pat. No. 7,608,668, herein incorporated by reference for that purpose. Analytical methods for determining properties (A) through (G) are disclosed in, for example, U.S. Pat. No. 7,608,668, Col. 31, line 26 through Col. 35, line 44, which is herein incorporated by reference for that purpose.

The ethylene/α-olefin multi-block interpolymer, and further copolymer, may comprise any one of properties (A) through (G), or may comprises a combination of two or more of (A) through (G).

Suitable monomers for use in preparing the present OBC include ethylene and one or more, and preferably one, addition polymerizable monomer(s) other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cycloolefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydro-naphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene. Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene and 1-octene, and more preferably 1-octene.

The olefin block copolymers can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19, and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. Nos. 7,608,668; 7,893,166; and 7,947,793.

In one embodiment, the ethylene/α-olefin multi-block copolymer, has a density of less than, or equal to, 0.910 g/cc, or less than, or equal to, 0.905 g/cc, or less than, or equal to, 0.900 g/cc, or less than, or equal to, 0.885 g/cc, or less than, or equal to, 0.880 g/cc.

In one embodiment, the ethylene/α-olefin multi-block copolymer, has a density greater than, or equal to, 0.855 g/cc, further greater than, or equal to, 0.860 g/cc, and further greater than, or equal to, 0.862 g/cc. Density is measured by the procedure of ASTM D-792-08.

In one embodiment, the ethylene/α-olefin multi-block copolymer, has a melting point greater than 80° C., or greater than 85° C., or greater than 90° C., or greater than 95° C., or greater than 100° C. The melting point is measured by Differential Scanning Calorimetry (DSC) method described in U.S. Publication 2006/0199930 (WO 2005/090427), incorporated herein by reference.

In one embodiment, the ethylene/α-olefin multi-block copolymer, has a melt index (I2) greater than, or equal to, 0.1 g/10 min, or greater than, or equal to, 0.5 g/10 min, or greater than, or equal to, 1.0 g/10 min, or greater than, or equal to, 5.0 g/10 min, or greater than, or equal to, 10 g/10 min as determined using ASTM D-1238 (190° C., 2.16 kg load).

In one embodiment, the ethylene/α-olefin multi-block copolymer, has a melt index (I2) less than, or equal to, 50 g/10 min, or less than, or equal to, 40 g/10 min, or less than, or equal to, 30 g/10 min, or less than, or equal to, 20 g/10 min, as determined using ASTM D-1238 (190° C., 2.16 kg load).

An olefin multi-block copolymer may comprise a combination of two or more embodiments as described herein.

An ethylene multi-block copolymer may comprise a combination of two or more embodiments as described herein.

An ethylene/α-olefin multi-block copolymer may comprise a combination of two or more embodiments as described herein.

Additives

In one embodiment, an inventive composition comprises at least one additive. Suitable additives include, but are not limited to, fillers, antioxidants, UV stabilizers, flame retardants, colorants or pigments, zinc oxide, stearic acid, zinc stearate, mold release agents, and combinations thereof.

Antioxidants include, but are not limited to, hindered phenols, bisphenols, and thiobisphenols; substituted hydroquinones; tris(alkylphenyl)phosphites; dialkylthiodi-propionates; phenylnaphthylamines; substituted diphenylamines; dialkyl, alkyl aryl, and diaryl substituted p-phenylene diamines; monomeric and polymeric dihydroquinolines; 2-(4-hydroxy-3,5-t-butylaniline)-4,6-bis(octylthio)1,3,5-triazine; hexahydro-1,3,5-tris-β-(3,5-di-t-butyl-4-hydroxyphenyl)propionyl-s-triazine; 2,4,6-tris(n-1,4-dimethylpentylphenylene-diamino)-1,3,5-triazine; and tris-(3,5-di-t-butyl-4-hydroxybenzyl)isocyanurate.

EMBODIMENTS

Specific embodiments of the present disclosure include but are not limited to the following:

1. A composition comprising the following components:
   A) a propylene/ethylene copolymer that has a density ≤0.880 g/cc, and a MWD(conv) from 2.00 to 3.00 and a melt viscosity (177° C.)≤80,000 mPa·s;
   B) olefin multi-block copolymer that has a density ≤0.890 g/cc and a melt index (I2)≥0.5 g/10 min.
2. The composition of embodiment 1, wherein the olefin multi-block copolymer is an ethylene multi-block copolymer, and further an ethylene/alpha-olefin multi-block copolymer.
3. The composition of embodiment 1 or 2, wherein the propylene/ethylene copolymer has a melt viscosity (177° C.)≤50,000 mPa·s.
4. The composition of any one of the previous embodiments, wherein the propylene/ethylene copolymer has a melt viscosity (177° C.)≤20,000 mPa·s.
5. The composition of any one of the previous embodiments, wherein the propylene/ethylene copolymer has a melt viscosity (177° C.)≤10,000 mPa·s.
6. The composition of any one of the previous embodiments, wherein the propylene/ethylene copolymer has a melt viscosity (177° C.)≤8,000 mPa·s.
7. The composition of any one of the previous embodiments, wherein the propylene/ethylene copolymer has a melt viscosity (177° C.)≥1,000 mPa·s.
8. The composition of any one of the previous embodiments, wherein the composition has a melt viscosity (150° C.) from 4,000 to 10,000 mPa·s.
9. The composition of any one of the previous embodiments, wherein the propylene/ethylene copolymer has a density ≥0.855 g/cc, or ≥0.858 g/cc, or ≥0.860 g/cc, or ≥0.862 g/cc, or ≥0.865 g/cc (1 cc=1 cm$^3$).
10. The composition of any one of the previous embodiments, wherein the propylene/ethylene copolymer has a density ≤0.885 g/cc, or ≤0.880 g/cc, or ≤0.878 g/cc, or ≤0.875 g/cc, or ≤0.870 g/cc.
11. The composition of any one of the previous embodiments, wherein the propylene/ethylene copolymer has a melt viscosity (177° C.)≥800 mPa·s, or ≥1000 mPa·s, or ≥1200 mPa·s, or ≥1400 mPa·s.
12. The composition of any one of the previous embodiments, wherein the propylene/ethylene copolymer has a melt viscosity (177° C.) from 2,000 mPa·s to 12,000 mPa·s, or from 4,000 mPa·s to 10,000 mPa·s, or from 5,000 mPa·s to 9,000 mPa·s, or from 6,000 mPa·s to 9,000 mPa·s.
13. The composition of any one of the previous embodiments, wherein the propylene/ethylene copolymer has a weight average molecular weight (Mw) from 30,000 to 70,000 g/mole, or from 35,000 to 60,000 g/mole, or from 40,000 to 50,000 g/mole.
14. The composition of any one of the previous embodiments, wherein the propylene/ethylene copolymer has a number average molecular weight (Mn) from 10,000 to 30,000 g/mole, or from 12,000 to 25,000 g/mole, or from 16,000 to 22,000 g/mole.
15. The composition of any one of the previous embodiments, wherein propylene/ethylene copolymer has a Mw/Mn from 2.00 to 4.00, or from 2.00 to 3.50, or from 2.00 to 3.00, or from 2.00 to 2.50, or from 2.10 to 2.45, or from 2.20 to 2.40.
16. The composition of any one of the previous embodiments, wherein the propylene/ethylene copolymer is present in the composition in an amount from 5.0 wt %, or 10 wt %, or 15 wt %, to 25 wt %, or 30 wt %, or 35 wt %, or 40 wt %, or 45 wt %, based on weight of the composition.
17. The composition of any one of the previous embodiments, wherein the olefin multi-block copolymer is an ethylene/alpha-olefin multi-block copolymer, and wherein the α-olefin is selected from C3-C20 α-olefins, further C3-C10 α-olefins.
18. The composition of embodiment 17, wherein the α-olefin is selected from propylene, 1-butene, 1-pentene, 1-hexene, 1-heptene and 1-octene, and further propylene, 1-butene, 1-hexene and 1-octene, and further 1-octene.
19. The composition of any one of the previous embodiments, wherein the olefin multi-block copolymer has a density ≥0.855 g/cc, or ≥0.858 g/cc, or ≥0.860 g/cc, or ≥0.862 g/cc, or ≥0.865 g/cc (1 cc=1 cm$^3$).
20. The composition of any one of the previous embodiments, wherein the olefin multi-block copolymer has a density ≤0.885 g/cc, or ≤0.880 g/cc, or ≤0.878 g/cc, or ≤0.875 g/cc, or ≤0.870 g/cc.
21. The composition of any one of the previous embodiments, wherein the olefin multi-block copolymer has a melt index I2≤1.0 g/10 min, or ≥2.0 g/10 min, or ≥4.0 g/10 min, or ≥6.0 g/10 min, or ≥8.0 g/10 min, or ≥10 g/10 min.
22. The composition of any one of the previous embodiments, wherein the olefin multi-block copolymer has a melt index I2≤50 g/10 min, or ≤45 g/10 min, or ≤40 g/10 min, or ≤35 g/10 min, or ≤30 g/10 min or ≤25 g/10 min, or ≤20 g/10 min.
23. The composition of any one of the previous embodiments, wherein the olefin multi-block copolymer is present in the composition in an amount from 2.0 wt %, or 4.0 wt %, or 6.0 wt %, to 12 wt %, or 14 wt %, or 16 wt %, or 18 wt %, or 20 wt %, based on weight of the composition.
24. The composition of any one of the previous embodiments, wherein the weight ratio of component A to component B from 1.2 to 5.0, or from 1.4 to 4.5, or from 1.6 to 4.0, or from 1.7 to 3.5, or from 1.8 to 3.0.
25. The composition of any one of the previous embodiments, wherein the composition further comprises the following: at least one tackifier; optionally, at least one oil; and optionally at least one wax; and further the tackifier is a hydrogenated tackifier.
26. The composition of any one of the previous embodiments, wherein the composition further comprises the following: at least one tackifier and at least one oil; and further the tackifier is a hydrogenated tackifier.
27. The composition of any one of the previous embodiments, wherein the composition comprises from 45 wt % to 75 wt %, or from 45 wt % to 75 wt %, or from 50 wt % to 70 wt %, or from 55 wt % to 65 wt % tackifier, based on the weight of the composition.
28. The composition of any one of the previous embodiments, wherein the composition comprises from 1.0 wt % to 20 wt %, or from 2.0 wt % to 18 wt %, or from 4.0 wt % to 16 wt %, or from 6.0 wt % to 14 wt %, or from 8.0 wt % to 12 wt % oil, based on the weight of the composition.
29. The composition of any one of the previous embodiments, wherein the composition has a melt viscosity, at 150° C., from 500 mPa·s to 20,000 mPa·s, or from 1,000 mPa·s to 15,000 mPa·s, or from 3,000 mPa·s to 10,000 mPa·s, or from 2,000 mPa·s to 8,000 mPa·s, or from 2,500 mPa·s to 6,000 mPa·s, or from 2,500 mPa·s to 5,000 mPa·s.
30. The composition of any one of the previous embodiments, wherein the composition has a melt viscosity, at 150° C., from 500 mPa·s to 8,000 mPa·s, or from 1000 mPa·s to 7,000 mPa·s, or from 2,000 mPa·s to 6,000 mPa·s, or from 2,500 mPa·s to 5,000 mPa·s.
31. The composition of any one of the previous embodiments, wherein the composition has a peel strength (N/25 mm)≥0.7, or ≥0.8, or ≥0.9, or ≥1.0.
32. The composition of any one of the previous embodiments, wherein the composition has a peel strength (N/25 mm) from 0.7 to 3.5, or from 0.8 to 3.2, or from 0.9 to 3.0, or from 1.0 to 3.0, or from 1.2 to 3.0, or from 1.4 to 3.0.
33. The composition of any one of the previous embodiments, wherein the composition comprises from 5.0 to 30 wt %, or from 10 to 25 wt % of the propylene/ethylene copolymer; from 40 to 70 wt %, from 50 to 65 wt % of a tackifier, and from 5.0 to 15 wt %, or from 7.0 to 12 wt % of an oil; each wt % based on the weight of the composition.
34. The composition of any one of the previous embodiments, wherein the composition further comprises one or more additives selected from antioxidants, fillers and/or colorants.
35. The composition of any one of the previous embodiments, wherein the composition further comprises from 0.10 to 1.00 wt %, or from 0.20 to 0.80 wt %, or from 0.50 to 0.60 wt % of one or more antioxidants, based on the weight of the composition.
36. An article comprising at least one component formed from the composition of any one of the previous embodiments.
37. The article of embodiment 36, wherein the article comprises at least one substrate.

Definitions

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. The term polymer includes trace amounts of impurities, for example catalyst residue, that may be incorporated into and/or within the polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, 50 wt % or a majority amount of olefin monomer, for example ethylene or propylene (based on the weight of the polymer), and optionally may comprise one or more comonomers.

The term, "propylene-based polymer," as used herein, refers to a polymer that comprises, in polymerized form, a majority amount of propylene monomer (based on the weight of the polymer), and optionally may comprise one or more comonomers.

The term, "propylene/α-olefin interpolymer," as used herein, refers to an interpolymer that comprises, in polymerized form, a majority amount of propylene monomer (based on the weight of the interpolymer), and at least one α-olefin.

The term, "propylene/α-olefin copolymer," as used herein, refers to a copolymer that comprises, in polymerized form, a majority amount of propylene monomer (based on the weight of the copolymer), and an α-olefin, as the only two monomer types.

The term, "propylene/ethylene copolymer," as used herein, refers to a copolymer that comprises, in polymerized form, a majority amount of propylene monomer (based on the weight of the copolymer), and ethylene, as the only two monomer types.

The term, "ethylene-based polymer," as used herein, refers to a polymer that comprises, in polymerized form, 50 wt % or a majority amount of ethylene monomer (based on the weight of the polymer), and optionally may comprise one or more comonomers. The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density is measured in accordance with ASTM D-792. The result is reported in grams (g) per cubic centimeter, or g/cc.

Gel Permeation Chromatography (GPCconv)

A high temperature gel permeation chromatography (GPC) system, equipped with Robotic Assistant Deliver (RAD) system for sample preparation and sample injection. The concentration detector is an Infra-Red detector (IR4)

from Polymer Char Inc. (Valencia, Spain). Data collection was performed using Polymer Char DM 100 Data acquisition box. The carrier solvent was 1,2,4-trichlorobenzene (TCB). The system was equipped with an on-line solvent degas device from Agilent. The column compartment was operated at 150° C. The columns were four Mixed A LS 30 cm, 20 micron columns. The solvent was nitrogen purged 1,2,4-trichlorobenzene (TCB), containing approximately 200 ppm 2,6-di-t-butyl-4-methylphenol (BHT). The flow rate was 1.0 mL/min, and the injection volume was 200 µl. A 2 mg/mL sample concentration was prepared by dissolving the sample in $N_2$ purged, and preheated TCB (containing 200 ppm BHT), for 2.5 hours at 160° C. with gentle agitation.

The GPC column set was calibrated by running twenty narrow molecular weight distribution polystyrene standards. The molecular weight (MW) of the standards ranges from 580 to 8,400,000 g/mol, and the standards were contained in six "cocktail" mixtures. Each standard mixture had at least a decade of separation between individual molecular weights. The equivalent polypropylene molecular weight of each PS standard was calculated by using following equation, with reported Mark-Houwink coefficients for polypropylene (Th. G. Scholte, N. L. J. Meijerink, H. M. Schoffeleers, and A. M. G. Brands, J. Appl. Polym. Sci., 29, 3763-3782 (1984)) and polystyrene (E. P. Otocka, R. J. Roe, N. Y. Hellman, P. M. Muglia, Macromolecules, 4, 507 (1971)):

$$M_{PP} = \left(\frac{K_{PS} M_{PS}^{a_{PP}+1}}{K_{PP}}\right)^{\frac{1}{a_{PP}+1}}, \quad (1)$$

where $M_{pp}$ is PP equivalent MW, $M_{PS}$ is PS equivalent MW, log K and a values of Mark-Houwink coefficients for PP and PS are listed below in Table A.

TABLE A

| Polymer | a | log K |
|---|---|---|
| Polypropylene | 0.725 | −3.721 |
| Polystyrene | 0.702 | −3.900 |

A logarithmic molecular weight calibration was generated using a fourth order polynomial fit as a function of elution volume. Number average and weight average molecular weights were calculated according to the following equations:

$$Mn = \frac{\sum_i Wf_i}{\sum_i (Wf_i / M_i)}, \quad (2)$$

$$Mw = \frac{\sum_i (Wf_i * M_i)}{\sum_i Wf_i}, \quad (3)$$

where $Wf_i$ and $M_i$ are the weight fraction and molecular weight of elution component i, respectively.

Differential Scanning Calorimetry (DSC)

Differential Scanning Calorimetry (DSC) is used to measure crystallinity in the polymers (e.g., ethylene-based (PE) polymers, or propylene-based (PP) polymers). About 5 mg to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 165 J/g, for PP, and multiplying this quantity by 100 (for example, % cryst.=(Hf/165 J/g)×100 (for PP)).

Unless otherwise stated, melting point(s) ($T_m$) of each polymer is determined from the second heat curve (peak Tm), and the crystallization temperature ($T_c$) is determined from the first cooling curve (peak Tc).

Melt Viscosity—Polymer

Melt viscosity was measured using a Brookfield Viscometer Model, and a Brookfield RV-DV-II-Pro viscometer spindle 31, at 177° C., for the propylene/C4-C10 alpha-olefin interpolymer. The sample was poured into the chamber, which was, in turn, inserted into a Brookfield Thermosel, and locked into place. The sample chamber has a notch on the bottom that fits the bottom of the Brookfield Thermosel, to ensure that the chamber was not allowed to turn, when the spindle was inserted and spinning. The sample (approximately 8-10 grams of resin) was heated to the required temperature, until the melted sample was about one inch below the top of the sample chamber. The viscometer apparatus was lowered, and the spindle submerged into the sample chamber. Lowering was continued, until the brackets on the viscometer aligned on the Thermosel. The viscometer was turned on, and set to operate at a shear rate, which led to a torque reading in the range of 40 to 60 percent of the total torque capacity, based on the rpm output of the viscometer. Readings were taken every minute for about 15 minutes, or until the values stabilized, at which point, a final reading was recorded.

Melt Viscosity—Composition

Melt viscosity was measured using a Brookfield Viscometer Model, at 150° C., in accordance with ASTM D-3236, using a Brookfield RV-DV-II-Pro viscometer and spindle SC4-27. The heating device was set for such temperature, and the spindle was positioned into the heating device, in order to be previously heated. Later, 9.5 grams of sample was weighted in a properly disposable sample chamber, and introduced into the heating device over a period of 5 minutes and/or until melted. The spindle was then positioned inside the melt for around 10 minutes. Once all the system was at the desired temperature, the speed was set around 20-50 rpm, in order to produce a torque value in the range of 70% to 90%. At intervals of three minutes, the viscosity value was read, in order to have a control of the viscosity behavior during all the experiment, finally the viscosity value was the one reported after 30 minutes.

Some embodiments of the present disclosure will now be described in detail in the following Examples.

EXAMPLES

Preparation of Propylene/Ethylene Copolymer (PE 1)

Catalyst B and cocatalyst component solutions are metered using pumps and mass flow meters, and are combined with the catalyst flush solvent, and introduced into the bottom of the reactor. The cocatalyst is a long-chain alkyl ammonium borate of approximate stoichiometry equal to methyl di(octadecyl)ammonium tetrakis(pentafluorophenyl) borate (MDB), combined with a tertiary component, tri (isobutyl)aluminum modified methyalumoxane (MMAO) containing a molar ratio of i-butyl/methyl groups of about 1/3. For Catalyst B, the cocatalyst is in a molar ratio based on Hf of 1.2/1, and MMAO (25/1 Al/Hf). The polymerization process is exothermic.

The propylene-ethylene copolymer is produced in a low-pressure, solution polymerization loop reactor, plus two heat exchanges, the total volume of which is 31.4 gallons (118.9 liter). Solvent and monomer (propylene) are injected into the reactor as a liquid. The comonomer (ethylene) gas is fully dissolved in the liquid solvent. The feed is cooled to 5° C., before injection into the reactor. The reactor operates at polymer concentration from 15 wt % to 20 wt %. The adiabatic temperature rise of the solution accounts for some of the heat removal from the polymerization reaction. Heat exchangers are used for reactor temperature control.

The solvent is a high purity iso-paraffinic fraction available from Exxon, under the trademark ISOPAR E. Fresh propylene is purified, before mixing with a recycle stream containing solvent, propylene, ethylene, and hydrogen. After mixing with the recycle stream, the combined stream is passed through a bed of molecular sieve for further purification, before using a high pressure feed pump to pass the contents to the reactor. Fresh ethylene is purified, before compressing the stream. Hydrogen (used to reduce molecular weight) is mixed with the compressed ethylene, before the two are mixed/dissolved into the liquid feed. The total stream is cooled to an appropriate feed temperature (5° C.). The reactor operates at 500-525 psig (3447-3619 kPa). The propylene conversion in the reactor is maintained by controlling the catalyst injection. The reaction temperature is maintained by controlling the water temperature across the heat exchanger at 85° C. The residence time in the reactor is about 10 minutes. Upon exiting the reactor, water and additive (500 ppm of a phenolic and 1000 ppm of a phosphite) are injected into the polymer solution. The water hydrolyzes the catalyst, terminating the polymerization reaction. The solvent and unreacted monomers are removed during the devolatilization process. The polymer melt is pumped to a die for underwater pellet cutting.

Hot Melt Adhesive Formulations and Brookfield Viscosity

Adhesive formulations (compositions) are listed in Table 1.

TABLE 1

| Ex | Composition | Melt Viscosity (Brookfield) 150° C. mPa · s |
|---|---|---|
| 1 | (75 wt/25 wt PE 1/9807) 29.0 wt % + (R1100) 61.5 wt % + (T145) 9.0 wt % + (1010) 0.5 wt % | 3140 |
| 2 | (65 wt/35 wt PE 1/9807) 29.0 wt % + (R1100) 61.5 wt % + (T145) 9.0 wt % + (1010) 0.5 wt % | 4612 |
| 3 | (75 wt/25 wt PE 1/9817) 29.0 wt % + (R1100) 61.5 wt % + (T145) 9.0 wt % + (1010) 0.5 wt % | 3180 |
| A | (PE 1) 42.0 wt % + (R1100) 57.5 wt % + (1010) 0.5 wt % | 3590 |
| B | ((PE 1) 35.0 wt % + (R1100) 64.5 wt % + (1010) 0.5 wt % | 2765 |
| C | (PE 1) 60.0 wt % + (R1100) 30.0 wt % + (T145) 9.5 wt % + (1010) 0.5 wt % | 4522 |
| D | (PE 1) 60.0 wt % + (R1100) 30.0 wt % + (222B) 9.5 wt % + (1010) 0.5 wt % | 4588 |

R1100 = REGALITE R1100 Tackifier; T145 = CATANEX T145 Oil; 1010 = IRGANOX 1010 Antioxidant; 222B = NYFLEX 222B oil.
9807 = INFUSE 9807: density = 0.866 g/cc, melt index (I2) = 15 g/10 min.
9817 = INFUSE 9817: density = 0.877 g/cc, melt index (I2) = 15 g/10 min.
PE 1 = see below.

PE 1 is a propylene-ethylene copolymer (random) with a melt viscosity (Brookfield) of 7813 mPa·s at 177° C., density 0.867/cm$^3$, Mn=19,160 g/mole, Mw=45,090 g/mole, MWD(conv)=2.35.

INFUSE 9807 is an olefin block copolymer, melt index (I2, 190° C., 2.16 kg)=15 g/10 min, and density=0.866 g/cc.

INFUSE 9817 is an olefin block copolymer, melt index (I2, 190° C., 2.16 kg)=15 g/10 min, and density=0.877 g/cc.

REGALITE R1100 is a hydrogenated tackifier resin from Eastman, with ring and ball softening point of 100° C.

CATENEX is a hydro-treated paraffinic processing oil form Shell.

NYFLEX 222B is a hydro-treated naphthenic processing oil from Nynas.

IRGANOX 1010 is an antioxidant from BASF.

Hot Melt Adhesive Compositions

The compositions were prepared with the ingredients and mixing procedures described herein. Blends were prepared in a laboratory type adhesive mixer (Model Z Blade mixer LUK) that consisted of a mixing blade powered by a motor, a heater, a temperature and "rpm control unit," and a mixing chamber of about 0.25 L in volume. Each sample was prepared, by first weighing the appropriate amount of each component, in order to make "200 g batches" of sample. Ingredients were added to the pre-heated (at 180° C.) mixing chamber, until melted, in the following sequence: first, the polymer; second, the oil; and third, the tackifier plus IRGANOX, to allow for good mixing, while limiting the heat or shear degradation of ingredients. Thereafter, two mixing stages were employed; three minutes at 20 rpm, followed by 10 minutes at 66 rpm. The set temperature for the regulator was 180° C. during all the mixing steps. The compositions were visually inspected for consistency.

Preparation of Adhesive Laminate

Non-woven/back-sheet laminates were prepared, using a Nordson/JHT Lab Coater (at room temperature). The melting tank, transfer hose and melt applicators were all set at 150° C. (application temperature). The adhesive add-on weights were 1, 2, 3 and 5 gsm (grams/square meter). The melt pump rpm was kept constant at 23 rpm, and line speed was varied to about 22, 16 and 8 m/min, to give the respective coating weights. Lamination pressure at the rubber roll nip was set at two bar. The slot coating die was perpendicular to the substrate, and positioned around 3-4 cm below the mid-point of the rubber roll, and around 6-8 mm in, in order to avoid die build-up. A "12 gsm" hydrophobic PP non-woven substrate, from Fitesa, was used, along with a "18 gsm" breathable PE back-sheet from Clopay Micro-Pro. The application was onto the non-woven substrate, and only slot coating was used during evaluations.

In order to separate the laminate, for the determination of the peel adhesion, a strip of silicone release liner, "20 mm wide by 200 mm long", was inserted between the back-sheet and the non-woven, prior to the application of the adhesive, and before the rubber roll nip. The laminate roll was immediately removed from the coating line, and was un-rolled by hand. During the un-rolling, the amount of roll sticking, observed during un-rolling, was rated as none, low, medium, high and very high.

Laminate Peel Adhesion (NW/HMA/BS)

Each sample, "25 mm width×200 mm length", was cut out from the above adhesive laminate, in the machine direction, using a manual NAEF Punch Press. The non-woven component was partially peeled away from the PE back-sheet, and both were firmly fixed to a clamp support. Adhesion was measured via the average peel, using a Zwick, equipped with a 100 N load cell, and selecting, according to ISO 11339, a separation rate of 300 mm/min, and a constant peel angle of 180 degrees, as a test configuration. The peel test was done at room temperature (25° C.). Results are shown in Table 2 below. As seen in Table 2, the composition containing the olefin block copolymer showed minimal roll-sticking, whereas the compositions, without olefin block copolymer, gave significant roll sticking.

TABLE 2

| EX | 1 | 1 | 1 | 2 | 2 | 2 | 3 | 3 | 3 | A | A |
|---|---|---|---|---|---|---|---|---|---|---|---|
| Coat Weight (gsm) | 2 | 3 | 5 | 2 | 3 | 5 | 2 | 3 | 5 | 2 | 3 |
| Set Temperature (° C.) | 150 | 150 | 150 | 150 | 150 | 150 | 150 | 150 | 150 | 150 | 150 |
| Melt Temperature (° C.) | 150 | 150 | 150 | 150 | 150 | 150 | 150 | 150 | 150 | 150 | 150 |
| Die Temperature (° C.) | 150 | 150 | 150 | 150 | 150 | 150 | 150 | 150 | 150 | 150 | 150 |
| Substrate 1 | 12 gsm NW | 12gsm NW | 12 gsm NW | 12 gsm NW | 12 gsm NW | 12 gsm NW | 12 gsm NW | 12 gsm NW | 12 gsm NW | 12 gsm NW | 12 gsm NW |
| Substrate 2 | 18 gsm back-sheet | 18 gsm back-sheet | | 18 gsm back-sheet | | 18 gsm back-sheet | | 18 gsm back-sheet | | 18 gsm back-sheet | |
| Application of HMA onto | NW | NW | NW | NW | NW | NW | NW | NW | NW | NW | NW |
| Melt Pump RPM | 23 | 23 | 23 | 23 | 23 | 23 | 23 | 23 | 23 | 23 | 23 |
| Output Average g/min | 6.91 | 6.91 | 6.91 | 6.91 | 6.91 | 6.91 | 6.93 | 6.93 | 6.93 | 6.92 | 6.92 |
| Lamination Pressure (bar) | 2 | 2 | 2 | 2 | 2 | 2 | 2 | 2 | 2 | 2 | 2 |
| Die Position | 4 cm down, 8 mmin 2 deg up | 4 cm down, 8 mmin 2 deg up | 4 cm down, 8 mmin 2 deg up | 4 cm down, 8 mmin 2 deg up | 4 cm down, 8 mmin 2 deg up | 4 cm down, 8 mmin 2 deg up | 4 cm down, 8 mmin 2 deg up | 4 cm down, 8 mmin 2 deg up | 4 cm down, 8 mmin 2 deg up | 4 cm down, 8 mmin 2 deg up | 4 cm down, 8 mmin 2 deg up |
| Roll Sticking | none | none | none | none | none | none | none | low | low | none | none |
| Peel (N/25 mm) | 1.9 | 1.8 | 2.0 | 1.8 | 2.5 | 2.9 | 1.4 | 0.7 | 0.9 | 0.3 | 0.3 |

| EX | A | B | B | B | C | C | C | D | D | D |
|---|---|---|---|---|---|---|---|---|---|---|
| Coat Weight (gsm) | 5 | 2 | 3 | 5 | 2 | 3 | 5 | 2 | 3 | 5 |
| Set Temperature (° C.) | 150 | 150 | 150 | 150 | 150 | 150 | 150 | 150 | 150 | 150 |
| Melt Temperature (° C.) | 150 | 150 | 150 | 150 | 150 | 150 | 150 | 150 | 150 | 150 |
| Die Temperature (° C.) | 150 | 150 | 150 | 150 | 150 | 150 | 150 | 150 | 150 | 150 |
| Substrate 1 | 12 gsm NW | 12 gsm NW | 12 gsm NW | 12 gsm NW | 12 gsm NW | 12 gsm NW | 12 gsm NW | 12 gsm NW | 12 gsm NW | 12 gsm NW |
| Substrate 2 | 18 gsm back-sheet | | 18 gsm back-sheet | | 18 gsm back-sheet | | 18 gsm back-sheet | | 18 gsm back-sheet | |
| Application of HMA onto | NW | NW | NW | NW | NW | NW | NW | NW | NW | NW |
| Melt Pump RPM | 23 | 23 | 23 | 23 | 23 | 23 | 23 | 23 | 23 | 23 |
| Output Average g/min | 6.92 | 6.925 | 6.925 | 6.925 | 6.97 | 6.97 | 6.97 | 6.9 | 6.9 | 6.9 |
| Lamination Pressure (bar) | 2 | 2 | 2 | 2 | 2 | 2 | 2 | 2 | 2 | 2 |
| Die Position | 4 cm down, 8 mmin 2 deg up | 4 cm down,8 mmin 2 deg up | 4 cm down, 8 mmin 2 deg up | 4 cm down,8 mmin 2 deg up | 4 cm down, 8 mmin 2 deg up | 4 cm down, 8 mmin 2 deg up | 4 cm down, 8 mmin 2 deg up | 4 cm down, 8 mmin 2 deg up | 4 cm down, 8 mmin 2 deg up | 4 cm down, 8 mmin 2 deg up |
| Roll Sticking | med | none | none | med | med | med | high | med | high | Very High |
| Peel (N/25 mm) | 0.3 | 1.8 | 1.8 | 3.1 | 2.4 | 3.1 | 4.4 | 2.6 | 3.2 | 4.6 |

What is claimed is:

1. A composition comprising the following components:
   A) from 5.0 wt % to 25 wt % of a propylene/ethylene copolymer, based on weight of the composition, that has a density ≤0.880 g/cc, and a Mw/Mn from 2.00 to 4.00 and a melt viscosity, at 177° C.≤80,000 mPa·s;
   B) olefin multi-block copolymer that has a density ≤0.890 g/cc and a melt index (I2)≥0.5 g/10 min;
   wherein the composition comprises ≤0.10 wt % of an ethylene-based polymer, based on the weight of the composition, not including the copolymer of component B.

2. The composition of claim 1, wherein the olefin multi-block copolymer is an ethylene/alpha-olefin multi-block copolymer.

3. The composition of claim 1, wherein the propylene/ethylene copolymer has a melt viscosity, at 177° C.≤50,000 mPa·s.

4. The composition of claim 1, wherein the composition has a melt viscosity, at 150° C. from 4,000 to 10,000 mPa·s.

5. The composition of claim 1, wherein the propylene/ethylene copolymer has a density ≥0.855 g/cc.

6. The composition of claim 1, wherein the propylene/ethylene copolymer has a weight average molecular weight (Mw) from 30,000 to 70,000 g/mole.

7. The composition of claim 1, wherein the propylene/ethylene copolymer is present in the composition in an amount of 15 wt % to 25 wt %, based on weight of the composition.

8. The composition of claim 1, wherein the olefin multi-block copolymer has a density ≥0.855 g/cc.

9. The composition of claim 1, wherein the olefin multi-block copolymer is present in the composition in an amount from 2.0 wt % to 20 wt %, based on weight of the composition.

10. The composition of claim 1, wherein the weight ratio of component A to component B is from 1.2 to 5.0.

11. The composition of claim 1, wherein the composition further comprises the following: at least one tackifier and at least one oil; and further the tackifier is a hydrogenated tackifier.

12. The composition of claim 1, wherein the composition has a melt viscosity, at 150° C., from 500 mPa·s to 20,000 mPa·s.

13. The composition of claim 1, wherein the composition has a peel strength, N/25 mm≥0.7.

14. An article comprising at least one component formed from the composition of claim 1.

* * * * *